United States Patent
Muller et al.

(10) Patent No.: US 9,434,640 B2
(45) Date of Patent: Sep. 6, 2016

(54) METHOD OF MAKING HEAT TREATED COATED ARTICLE WITH CARBON BASED COATING AND PROTECTIVE FILM

(71) Applicant: Guardian Industries Corp., Auburn Hills, MI (US)

(72) Inventors: Jens-Peter Muller, Differdange (LU); Herbert Lage, Luxembourg (LU); Thorsten Frost, Luxembourg (LU); Vijayen S. Veerasamy, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 149 days.

(21) Appl. No.: 13/693,411

(22) Filed: Dec. 4, 2012

(65) Prior Publication Data
US 2014/0150497 A1 Jun. 5, 2014

(51) Int. Cl.
C03C 17/34 (2006.01)
C03C 23/00 (2006.01)
C03C 17/22 (2006.01)

(52) U.S. Cl.
CPC .......... C03C 17/22 (2013.01); C03C 17/3441 (2013.01); C03C 2217/78 (2013.01); C03C 2218/154 (2013.01); C03C 2218/322 (2013.01); C03C 2218/328 (2013.01); C03C 2218/355 (2013.01); Y10T 156/10 (2015.01); Y10T 428/30 (2015.01)

(58) Field of Classification Search
CPC .......... C03C 17/3411; C03C 17/3441; C03C 17/3482; C03C 23/0055; C03C 2218/31; C03C 2218/322; C03C 2218/328; C03C 2218/355

USPC ............................................................. 65/23
See application file for complete search history.

(56) References Cited

U.S. PATENT DOCUMENTS

| | | | |
|---|---|---|---|
| 6,777,030 B2 | 8/2004 | Veerasamy et al. |
| 7,820,019 B2 | 10/2010 | Butz et al. |
| 7,964,238 B2 | 6/2011 | Murphy et al. |
| 8,003,167 B2 | 8/2011 | Krasnov et al. |
| 8,071,166 B2 | 12/2011 | Petrmichl et al. |

(Continued)

FOREIGN PATENT DOCUMENTS

| | | |
|---|---|---|
| WO | WO 02/091064 | 11/2002 |
| WO | WO 2009/067133 | 5/2009 |

OTHER PUBLICATIONS

U.S. Appl. No. 13/491,743, filed Jun. 8, 2012; Muller et al.

(Continued)

*Primary Examiner* — Angela Ortiz
*Assistant Examiner* — Cynthia Szewczyk
(74) *Attorney, Agent, or Firm* — Nixon & Vanderhye P.C.

(57) ABSTRACT

A method of making a heat treated (HT) or heat treatable coated article. A method of making a coated article includes a step of heat treating a glass substrate coated with at least layer of or including carbon (e.g., diamond-like carbon (DLC)) and an overlying protective film thereon. In certain example embodiments, the protective film may be of or include both (a) an oxygen blocking or barrier layer, and (b) a release layer of or including zinc oxide. Treating the zinc oxide inclusive release layer with plasma including oxygen (e.g., via ion beam treatment) improves thermal stability and/or quality of the product. Following and/or during heat treatment (e.g., thermal tempering, or the like) the protective film may be entirely or partially removed.

21 Claims, 6 Drawing Sheets

(56) References Cited

U.S. PATENT DOCUMENTS

| | | |
|---|---|---|
| 8,132,426 B2 | 3/2012 | Petrmichl et al. |
| 8,147,972 B2 | 4/2012 | Veerasamy |
| 8,197,941 B2 | 6/2012 | Veerasamy |
| 8,277,946 B2 | 10/2012 | Veerasamy |
| 2002/0068167 A1 | 6/2002 | Veerasamy |
| 2006/0083932 A1* | 4/2006 | Kleideiter et al. ............ 428/432 |
| 2008/0302462 A1* | 12/2008 | Sol et al. .................... 156/101 |
| 2012/0015195 A1 | 1/2012 | Wang et al. |
| 2012/0015196 A1 | 1/2012 | Wang et al. |
| 2012/0040160 A1 | 2/2012 | Wang et al. |

OTHER PUBLICATIONS

U.S. Appl. No. 448,733, filed Apr. 17, 2012; Veerasamy.
U.S. Appl. No. 13/174,336, filed Jun. 30, 2011; Wang et al.

\* cited by examiner

METHOD OF MAKING HEAT TREATED COATED ARTICLE WITH CARBON BASED COATING AND PROTECTIVE FILM

Certain embodiments of this invention relate to a method of making a heat treated (HT) or heat treatable coated article to be used in shower door applications, window applications, tabletop applications, or any other suitable applications. For example, certain embodiments of this invention relate to a method of making a coated article including a step of heat treating a glass substrate coated with at least layer of or including carbon (e.g., diamond-like carbon (DLC)) and an overlying protective film thereon. In certain example embodiments, the protective film may be of or include both (a) an oxygen blocking or barrier layer, and (b) a release layer, with the release layer being located between at least the carbon based layer and the oxygen blocking layer. The release layer may be of or include zinc oxide. Surprisingly, it has been found that treating the zinc oxide inclusive release layer with plasma including oxygen (e.g., via ion beam treatment), prior to deposition of the oxygen blocking or barrier layer, improves thermal stability and/or quality of the product. Following and/or during heat treatment (e.g., thermal tempering, or the like) the protective film may be entirely or partially removed. Other embodiments of this invention relate to the pre-HT coated article, or the post-HT coated article.

BACKGROUND AND SUMMARY OF THE INVENTION

Coated articles such as transparent shower doors and IG window units are often heat treated (HT), such as being thermally tempered, for safety and/or strengthening purposes. For example, coated glass substrates for use in shower door and/or window units are often heat treated at a high temperature(s) (e.g., at least about 580 degrees C., more typically from about 600-650 degrees C.) for purposes of tempering.

Diamond-like carbon (DLC) is sometimes known for its scratch resistant properties. For example, different types of DLC are discussed in the following U.S. Pat. Nos. 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and 5,470,661, all of which are hereby incorporated herein by reference.

It would sometimes be desirable to provide a window unit or other glass article with a protective coating including DLC in order to protect it from scratches and the like. Unfortunately, DLC tends to oxidize and burn off at temperatures of from approximately 380 to 400 degrees C., as the heat treatment is typically conducted in an atmosphere including oxygen. Thus, it will be appreciated that DLC alone as a protective overcoat cannot withstand heat treatments (HT) at the extremely high temperatures described above which are often required in the manufacture of vehicle windows, IG window units, glass table tops, and/or the like.

Prior art FIG. 1 illustrates a conventional technique which is described in U.S. Pat. No. 8,071,166, the disclosure of which is hereby incorporated herein by reference. As shown in FIG. 1, prior to thermal tempering, a coated article includes a glass substrate 1, a DLC layer 11, a zinc oxide release layer 117a, and an aluminum nitride (e.g., AlN) oxygen barrier layer 17b. Much of the protective overcoat 17 thickness consists of a cermet (ZnO—Zn) 117a, the rest being a dense dielectric of AlN 17b. This coated article on the left side of FIG. 1 is then subjected to heat treatment (HT) such as thermal tempering, and the protective film 17 protects the DLC layer 11 during such heat treatment and prevents the DLC from completely burning off. Following the HT, the protective film 17 is removed using a liquid as described in the '166 patent. Thus, DLC layer 11 is protected with a thermal barrier overcoat film 17 that protects the carbon based layer 11 from complete oxidation during tempering, with the protective film 17 thereafter being removed.

It has been found that the cermet (ZnO—Zn; ZnOx) 117a has a high electrochemical potential compared to stoichiometric ZnO, and is therefore thermodynamically metastable. The cermet is susceptible to humidity ingress and acts like a battery during sequences of high and low humidity/temperature. Over-extended grains of ZnO—Zn cermet are believed to create regions of high electrochemical potential which are readily attacked by water molecules to start an oxidative corrosion process of Zn to ZnO. It is believed that these problems, including a significantly chemically active surface of the layer 117a, is/are caused at least in part by the cermet 117a not being fully oxidized ZnO. Layers 117a and 17b have to survive handling and processing prior to and during the thermal tempering process. To address these deficiency caused by the (ZnO—Zn; ZnOx) 117a, it has been attempted to further protect the protective film 17 with an overlying thin polymer based flexible Temporary Protective Film (TPF), not shown in FIG. 1, that can be later peeled off.

It has been found that the stoichiometry of the $ZnO_x$ is not a dielectric, as it displays semiconducting behavior and has a polycrystalline Wurtzite structure with metallic and sub-stoichiometric ZnOx. This material is not hard, is susceptible to water ingress, and can be scratched off easy. In order to avoid or reduce handling scratches, which would degrade the thermal protection of DLC during tempering and therefore burn the DLC, the TPF (e.g., of polyethylene for example) coated with a pressure sensitive adhesive on one side is applied over the AlN. This TPF is not available for float glass having a width of 3.21 m. Thus, when manufacturing products having a large width such as 3.21 m, two smaller TPF films are overlapped in order to cover the large width, and the overlap tends to occur in an area of the product where the glass is coated with DLC (e.g., in an approximately central area of the product). For example, TPF (e.g., Nitto TPF A7) from a big TPF roll of 2.56 m (100 inch) and from a small roll of 66 cm width can be used, with the TPF from the respective rolls overlapping on the product prior to HT.

This overlap of adjacent TPF films at the seam creates a capillary. In an attempt to avoid water penetrating into this capillary, it has been attempted to close the slit with UV-curable gel for example. However, this gel reacts with the reactive cermet (ZnO—Zn; ZnOx) in front of the tempering process, in a reaction which is promoted by water. This then yields a line of degraded DLC indicated by haze in reflection and/or burn marks where the overlap occurred. These haze and/or burn marks, which occur in the DLC following HT in areas where the overlap occurred, are detrimental and not desired by customers.

In certain example embodiments of this invention, prior to the heat treatment (HT) and prior to the deposition of the AlN inclusive layer of the protective film, there is presented a technique for transforming the cermet ZnOx to a more stable $ZnO_x$ via plasma passivation treatment. For example, the ZnO, based layer can be treated with a plasma of or including oxygen plasma, from an ion beam source(s). The ion beam treatment may be from an ion source(s) in collimated mode in certain example embodiments. Alternatively, the ion beam treatment may be from an ion source in a diffuse mode. After the ion beam treatment of the $ZnO_x$, the barrier layer (e.g., AlN layer) is then deposited over the ion beam treated $ZnO_x$. Surprisingly, it has been found that treating the zinc oxide inclusive release layer with plasma including oxygen (e.g., via ion beam treatment), prior to deposition of the oxygen blocking or barrier layer, improves thermal stability and/or quality of the product. For example, it has been found that the ion beam treatment of the layer comprising $ZnO_x$ reduces the concentration of OH-groups on the layer's surface and reduces the layer's surface roughness, thereby improving the layer's thermal stability and reducing the likelihood of the undesirable burning. Following and/or during heat treatment (e.g., thermal tempering, or the like) the protective film may be entirely or partially removed.

Example advantages include one or more of: (i) reduced or elimination of burn marks where the TPF overlap occurred; (ii) improved thermal and/or humidity stability of the protective film; and (iii) easy removal of the protective film after thermal tempering.

In certain example embodiments of this invention, there is provided a method of making a coated article, the method comprising: depositing a release layer comprising zinc oxide on a glass substrate, wherein at least a layer comprising carbon is located between the glass substrate and the release layer comprising zinc oxide; ion beam treating the layer comprising zinc oxide with at least oxygen ions to provide an ion beam treated layer comprising zinc oxide; depositing an oxygen barrier layer on the glass substrate over the ion beam treated layer comprising zinc oxide; and wherein a protective film comprising the ion beam treated layer comprising zinc oxide and the oxygen barrier layer are for protecting the layer comprising carbon during subsequent heat treatment in order to prevent significant burnoff of the layer comprising carbon.

In certain example embodiments, there is provided a method of making a heat treated coated article, the method comprising: heat treating a coated glass substrate, the coated glass substrate comprising, prior to the heat treating, a glass substrate, a layer comprising diamond-like carbon (DLC) on the glass substrate, and a protective film on the glass substrate over at least the layer comprising DLC, wherein the protective film includes (i) a release layer comprising zinc oxide which has been ion beam treated with at least oxygen ions, and (ii) and an oxygen barrier layer, the release layer and the oxygen barrier layer being of different material; during said heat treating of the coated glass substrate with the layer comprising DLC and the protective film thereon, the protective film prevents significant burnoff of the layer comprising DLC, and wherein the heat treating comprises heating the glass substrate to temperature(s) sufficient for thermal tempering, heat strengthening, and/or heat bending; and exposing the protective film to a release liquid and removing at least part of the protective film during and/or after said heat treating.

In certain example embodiments of this invention, there is provided a coated article comprising: a glass substrate supporting a coating, the coating comprising moving away from the glass substrate: a layer comprising diamond-like carbon (DLC); a layer comprising zinc oxide (e.g., which may be ion beam treated), wherein a concentration of OH-groups at a surface of the layer comprising zinc oxide farthest from the glass substrate is no greater than about 40%; and a layer comprising aluminum nitride on the glass substrate over and directly contacting the layer comprising zinc oxide.

DETAILED DESCRIPTION OF EXAMPLE EMBODIMENTS OF THE INVENTION

Figure 1:
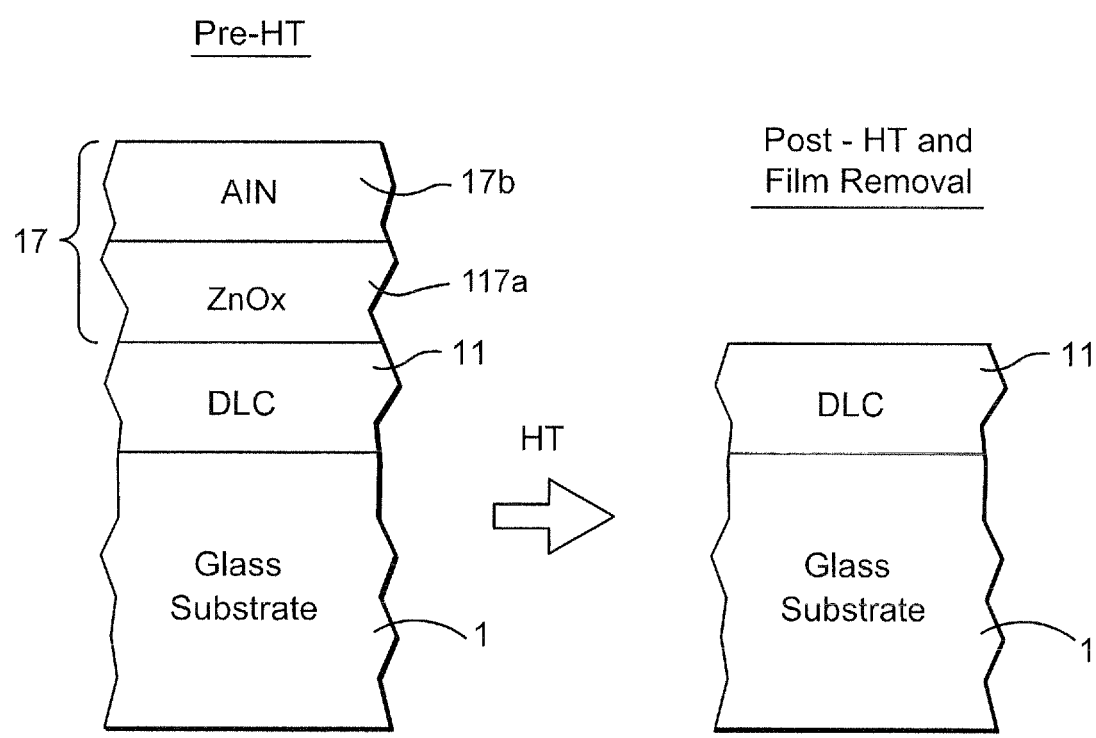
FIG. 1 is a schematic cross sectional view of a coated article, prior to and following heat treatment, according to a conventional technique.

Referring now more particularly to the accompanying drawings in which like reference numerals indicate like parts throughout the several views.

Prior to thermal tempering, a coated article includes at least a glass substrate 1, a carbon based layer 11 of or including a material such as DLC, a release layer 17a, 17a' of or including zinc oxide $ZnO_x$, an oxygen barrier layer 17b of or including a material such as aluminum nitride (e.g., AlN), and optionally a protective overcoat 17c of a material such as TPF (which may be peeled off when desired) or silicon nitride. As the zinc oxide layer 17a is sputter-deposited on (directly or indirectly) the glass substrate 1, it is of or includes a cermet (ZnO—Zn). After the oxygen barrier layer 17b is deposited over the zinc oxide layer, and optionally after an additional TPF overcoat 17c has been applied and peeled off, the coated article including glass substrate and layers 11, 17a' and 17b is subjected to heat treatment (HT) such as thermal tempering, and the protective film 17 protects the carbon based layer 11 during such heat treatment and prevents the carbon based layer (e.g., DLC) from completely burning off. Following the HT, the protective film 17 is removed using a liquid, as the release layer 17a' is easily susceptible to removal using a liquid such as vinegar and/or water. Thus, DLC layer 11 is protected with a thermal barrier overcoat film 17 that protects the carbon based layer 11 from complete oxidation during tempering, with the protective film 17 thereafter being removed.

In certain example embodiments of this invention, prior to the heat treatment (HT) and prior to the deposition of the AlN inclusive layer 17b of the protective film 17, there is presented a technique for transforming the cermet ZnOx 17a to a more stable $ZnO_x$ 17a' via plasma passivation treatment. For example, the sputter deposited $ZnO_x$ based layer 17a is treated with a plasma of or including oxygen plasma, e.g., from an ion beam source(s) 30. The ion beam 31 treatment may be from an ion source(s) 30 in collimated mode, or other suitable mode, in certain example embodiments. After the ion beam treatment of the $ZnO_x$, a barrier layer (e.g., AlN layer) 17b is then deposited over the ion beam treated ZnO$_x$ 17a'. Surprisingly, it has been found that treating the zinc oxide inclusive release layer 17a with plasma including oxygen (e.g., via ion beam treatment), prior to deposition of the oxygen blocking or barrier layer 17b, improves thermal stability and/or quality of the product. For example, it has been found that the ion beam treatment of the layer comprising ZnO$_x$ 17a reduces the concentration of OH-groups on the layer's surface and reduces the layer's surface roughness, thereby improving the layer's thermal stability and reducing the likelihood of the undesirable burning. Example advantages include one or more of: (i) reduced or elimination of burn marks where the optional TPF overlap occurred; (ii) improved thermal and/or humidity stability of the protective film 17; and (iii) easy removal of the protective film 17 after thermal tempering.

In certain instances, the HT may involve heating a supporting glass substrate 1, with the carbon (e.g., DLC) 11 thereon and the layers 17a' and 17b thereon, to temperature(s) of from 550 to 800 degrees C., more preferably from 580 to 800 degrees C. (which is well above the burn-off temperature of DLC). The sacrificial protective film 17 allows the DLC 11 to withstand such HT without significantly burning off and/or without significantly oxidizing during the same. Sacrificial protective film 17 is formed on the glass substrate 1 over the DLC 11 to reduce the likelihood of the DLC burning off during HT. Thus, the majority (if not all) of the DLC 11 remains on the glass substrate 1, and does not burn off, during the HT. Following HT, the sacrificial protective film 17 (which may include two or more layers) may or may not be removed in different embodiments of this invention.

In certain example embodiments, the sacrificial protective film 17 may be of or include both (a) an oxygen blocking or barrier layer 17b, and (b) a release layer. The release layer is sputter-deposited as 17a, and is then subjected to ion beam treatment to transform it into 17a'. An example advantage of using distinct and different oxygen-blocking and release layers in film 17 is that each layer (17a and 17b) can be optimized for its intended function. Consequently, the optimized performance of the sacrificial film 17 may be improved and it can be made thinner if desired. In certain example embodiments, following HT and removal of the film 17, the DLC inclusive layer 11 protects the glass substrate 1 against abrasion and corrosion, and against adhesion of minerals in hard water (e.g., has good hard water cleanability).

Figure 2:
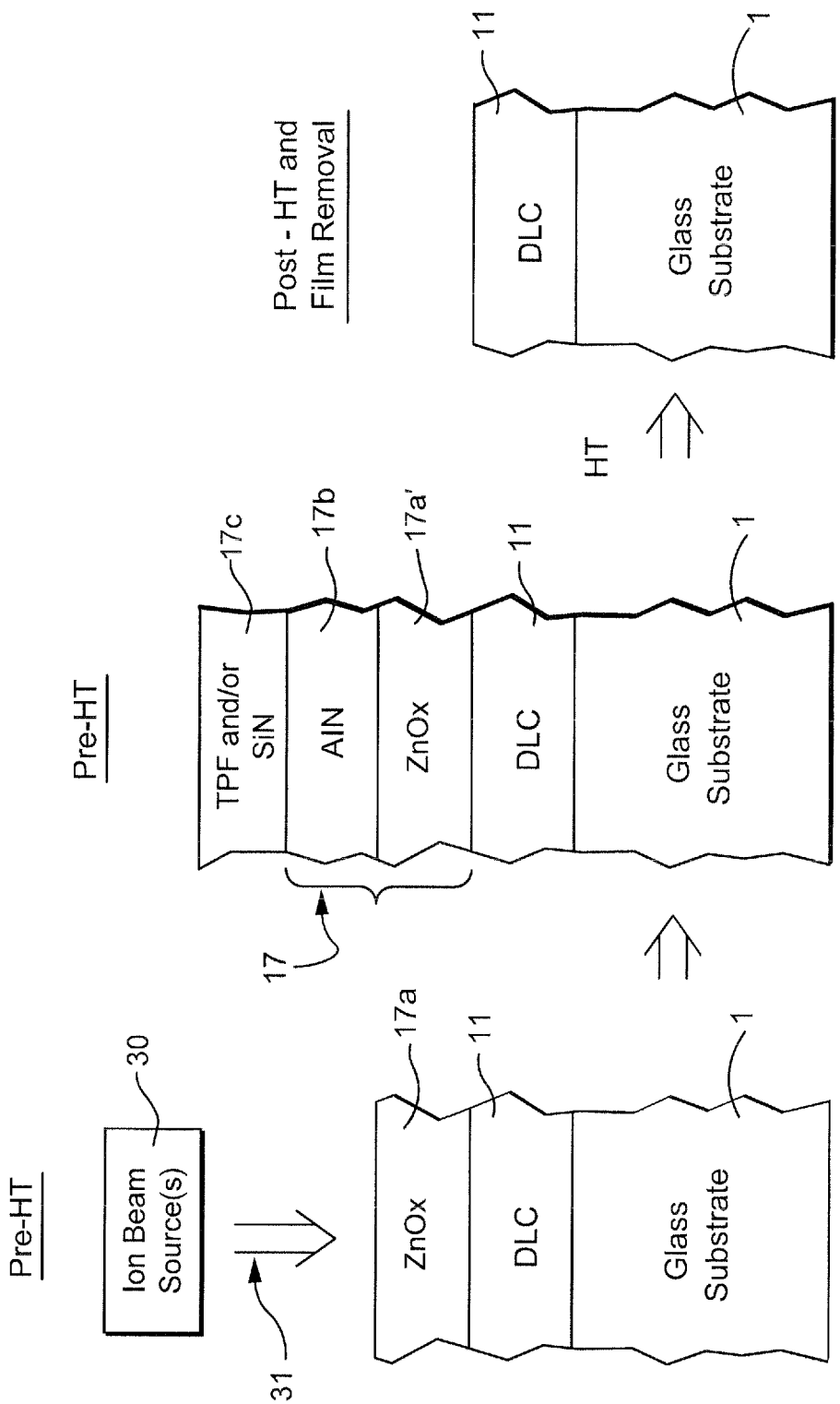
FIG. 2 is a schematic cross sectional view of a coated article, prior to and following heat treatment, according to an example embodiment of this invention.

FIG. 2 is a schematic cross sectional view of a coated article, before and after heat treatment, according to an example embodiment of this invention. The coated article shown at the far left of FIG. 2 includes glass substrate 1, DLC inclusive layer 11, and sputter deposited release layer 17a of or including ZnO$_x$. As sputter-deposited, ZnO$_x$ layer 17a has a chemically active outer surface believed to be caused at least in part by the cermet (ZnO—Zn; ZnOx) not being fully oxidized ZnO. In certain example embodiments, the ZnO$_x$ layer 17a may be doped with small amounts of aluminum and/or nitrogen. Glass substrate 1 is typically of or includes soda-lime-silica glass, although other types of glass may be used in certain instances.

DLC inclusive layer 11 may be from about 5 to 1,000 angstroms (Å) thick in certain example embodiments of this invention, more preferably from 10-300 Å thick, and most preferably from 20 to 65 Å thick, possibly from about 25-50 Å thick, with an example thickness being about 30 angstroms. In certain example embodiments of this invention, DLC layer 11 may have an average hardness of at least about 10 GPa, more preferably at least about 20 GPa, and most preferably from about 20-90 GPa. Such hardness renders layer(s) 11 resistant to scratching, certain solvents, and/or the like. Layer 11 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC type or any other suitable type of DLC may include from 1 to 30% hydrogen, more preferably from 5-20% H, and most preferably from 10-20% H. This t-aC type of DLC includes more sp$^3$ carbon—carbon (C—C) bonds than sp$^2$ carbon—carbon (C—C) bonds. In certain example embodiments, at least about 30% or 50% of the carbon-carbon bonds in DLC layer 11 may be sp$^3$ carbon—carbon (C—C) bonds, more preferably at least about 60% of the carbon-carbon bonds in the layer 11 may be sp$^3$ carbon—carbon (C—C) bonds, and most preferably at least about 70% of the carbon-carbon bonds in the layer 11 may be sp$^3$ carbon—carbon (C—C) bonds. In certain example embodiments of this invention, the DLC may have an average density of at least about 2.4 gm/cm$^3$, more preferably at least about 2.7 gm/cm$^3$. Example linear ion beam sources that may be used to deposit DLC inclusive layer 11 on substrate 1 include any of those in any of U.S. Pat. Nos. 6,261,693, 6,002,208, 6,335,086, or 6,303,225 (all incorporated herein by reference). When using an ion beam source to deposit layer(s) 11, hydrocarbon feedstock gas(es) (e.g., C$_2$H$_2$), HMDSO, or any other suitable gas, may be used in the ion beam source in order to cause the source to emit an ion beam toward substrate 1 for forming layer(s) 11. It is noted that the hardness and/or density of layer(s) 11 may be adjusted by varying the ion energy of the depositing apparatus. DLC layer 11 allows the coated article to be easier to clean from hard water and be more scratch resistant than if the DLC 11 were not provided. It is noted that while layer 11 is on glass substrate 1 in certain embodiments of this invention, additional layer(s) may or may not be under layer 11 between the substrate 1 and layer 11 in certain example embodiments of this invention. Thus, the phrase "on" as used herein is not limited to being in direct contact with the substrate as other layer(s) may still be provided therebetween. Thus, "on" and "support" as used herein mean both directly on and indirectly on with other layer(s) therebetween.

For example and without limitation, the layer 11 of or including DLC may be any of the DLC inclusive layers of any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; or 5,470,661 (all of these patents hereby being incorporated herein by reference), or alternatively may be any other suitable type of DLC inclusive layer. The DLC 11 may or may not include from about 5-30% Si, more preferably from about 5-25% Si, and possibly from about 10-20% Si in certain example embodiments of this invention. Hydrogen may also be provided in the DLC in certain instances.

Sacrificial protective film 17 is provided in order to protect DLC layer 11 during HT. If film 17 were not provided, the DLC 11 would significantly oxidize during HT and burn off, thereby rendering the final product defenseless against scratching. However, the presence of sacrificial protective film 17 prevents or reduces the amount of oxygen which can reach the DLC 11 during HT from the surrounding atmosphere, thereby preventing the DLC from significantly oxidizing during HT. As a result, after HT, the DLC inclusive layer 11 remains on the glass substrate 1 in order to be easier to clean from hard water and provide scratch resistance and/or the like. In certain example embodiments, the protective film 17 includes both an oxygen blocking or barrier layer 17b, and an underlying release layer 17a'. The release layer 17a, 17a' may be in directly contact with the DLC layer 11 in certain example embodiments, e.g., as shown in FIG. 2.

As shown at the far left of FIG. 2, after $ZnO_x$ layer 17a is sputter-deposited on the glass substrate 1, at least one ion source 30 is used to ion beam treat the $ZnO_x$ layer 17a with at least oxygen ions in order to transform the cermet ZnOx 17a to a more stable ZnO, 17a' via this plasma passivation treatment. The ion beam 31 treatment may be from an ion source(s) 30 in collimated mode, or other suitable mode, in certain example embodiments. The ion beam 31 treatment of the $ZnO_x$ 17a, which further oxidizes layer 17, is preferably performed directly after the $ZnO_x$ 17a has been sputter-deposited (before any other layer has been sputter-deposited thereover), in a neighboring compartment/chamber of a deposition apparatus, with or without a pumping-out section being provided between the vacuum sputtering chamber(s) where the $ZnO_x$ 17a is deposited and the vacuum chamber where the ion beam source(s) 30 is located for treating the zinc oxide with an ion beam(s) 31. In example embodiments, pure or substantially pure oxygen gas is introduced into the ion source 30 for generating the ion beam 31 that is used to ion beam treat the zinc oxide based release layer. For example, the gas introduced into the ion source 30 for generating the ion beam 31 may be $O_2$, and may be free of or substantially free of carbon. For instance, the gas introduced into the ion source may have from 0-15% carbon, more preferably from 0-10% or 0-5% carbon (atomic %), so that little or no carbon ions are implanted into the layer 17a, 17a' via the ion beam from the source 30. However, it is possible for other gas(es) (e.g., argon and/or nitrogen) to be present in the vacuum chamber where the ion beam treatment occurs so that amounts of such materials (e.g., Ar and/or N) end up being introduced into the release layer in the ion beam treatment chamber. The ion beam treatment may be of the "peening" type which is performed after the layer 17a has been sputter deposited, or of the ion beam assisted deposition (IBAD) type which is performed during the deposition of the zinc oxide based release layer. In certain example embodiments. A relatively high anode-cathode voltage is utilized in the ion source(s) 30 in example embodiments of this invention for the ion beam treatment of the zinc oxide release layer, preferably at least about 1,000 V, more preferably at least about 1,500 V, and sometimes at least about 3,000 V. Too low of a voltage results in the burn marks in areas of TPF overlap not disappearing. A preferred voltage is from about 1,500-5,000V, more preferably from 1,500-3.500 V, with examples being 1,500 V and 3,000 V.

Figure 4A:
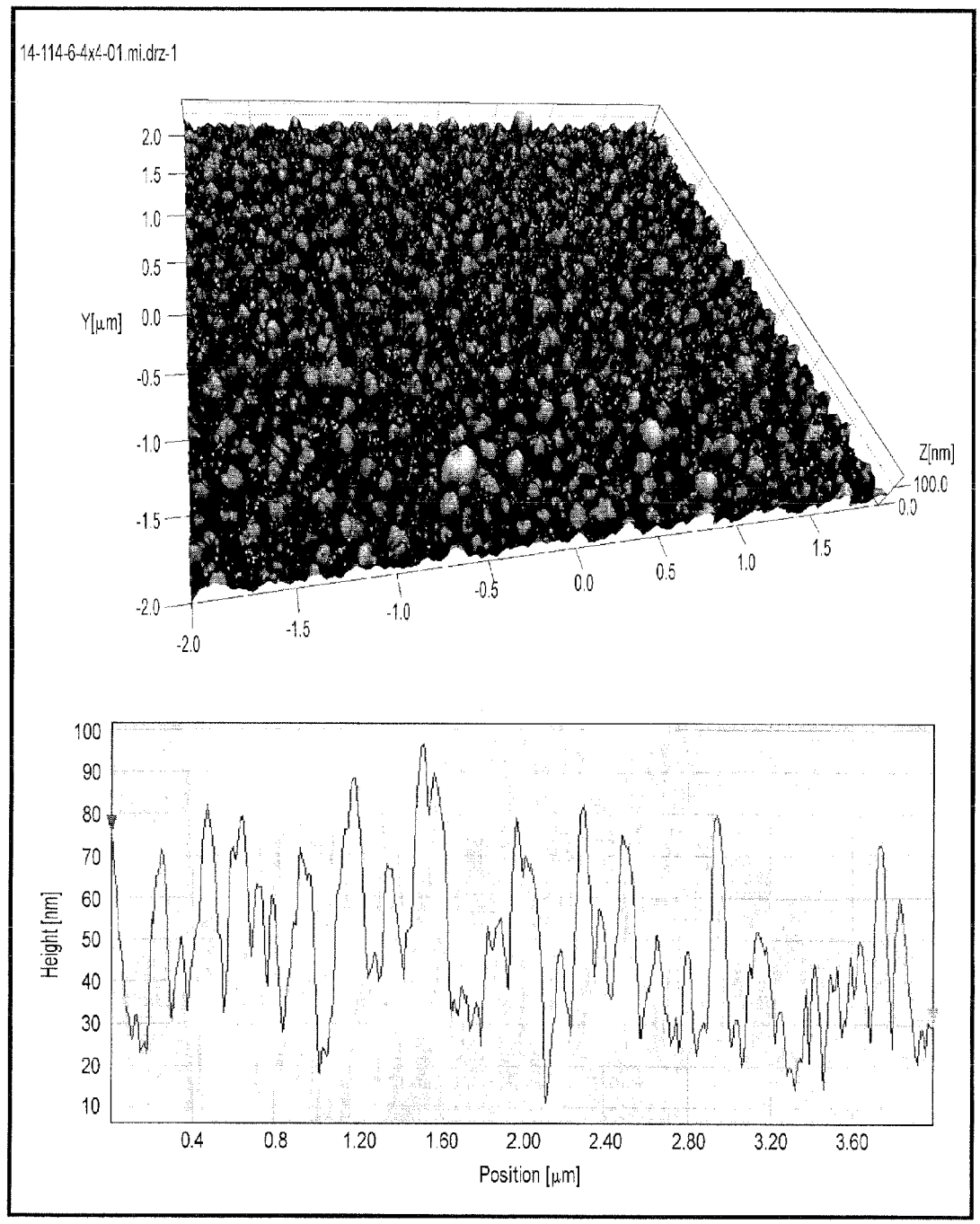
FIGS. 4(a) and 4(b) are Atomic Force Microscopy (AFM) and position (μm) vs. height (nm) graphs with horizontal line scan illustrating the surface of a ZnO layer without (FIG. 4(a)) and with (FIG. 4(b)) oxygen ion beam treatment.
Figure 4B:
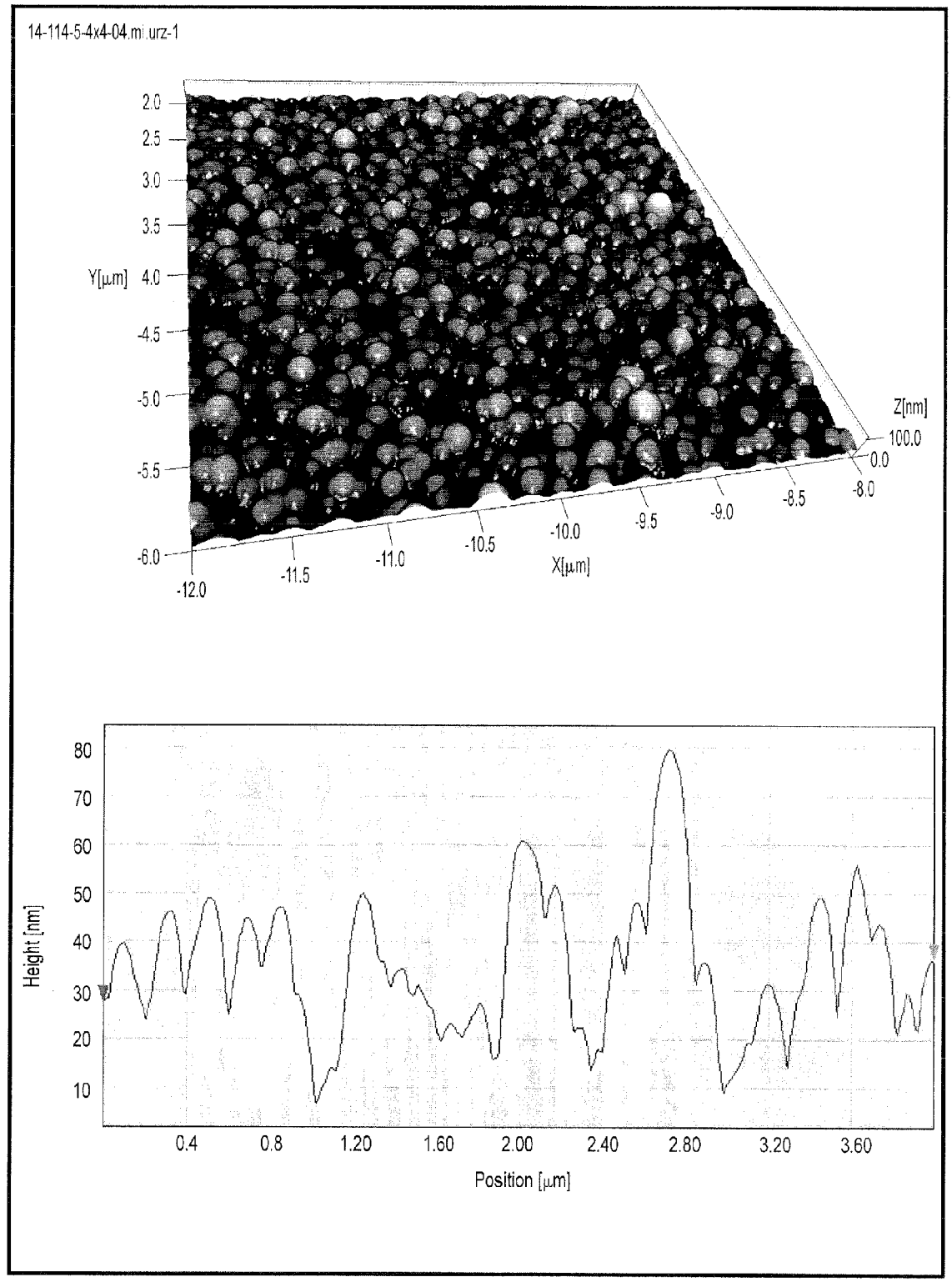

FIGS. 4(*a*) and 4(*b*) are Atomic Force Microscopy (AFM) and position (μm) vs. height (nm) graphs with horizontal line scan illustrating the surface of a $ZnO_x$ layer without (FIG. 4(*a*)—layer 17a) and with (FIG. 4(*b*)—ion beam treated layer 17a') oxygen ion beam treatment. Thus, differences of the ZnO surface have been analysed with AFM. FIG. 4 shows a 3D reconstruction of topographic image and a corresponding line scan, with and without the ion beam treatment. As shown in FIGS. 4(*a*)-(*b*), the surface roughness parameters Sy, St and Si of the zinc oxide layer can be reduced by a linear ion beam treatment with oxygen ions using 1500 V from about 200 nm for non-treated (FIG. 4(*a*)) to about 105 nm for the ion beam treated ZnO layer 17a'. Thus, in certain example embodiments of this invention, the ion beam treatment 31 of the zinc oxide layer causes the average surface roughness of the zinc oxide release layer to reduce by at least about 20 nm, more preferably by at least about 50 nm, and most preferably by at least about 75 nm.

Figure 5A:
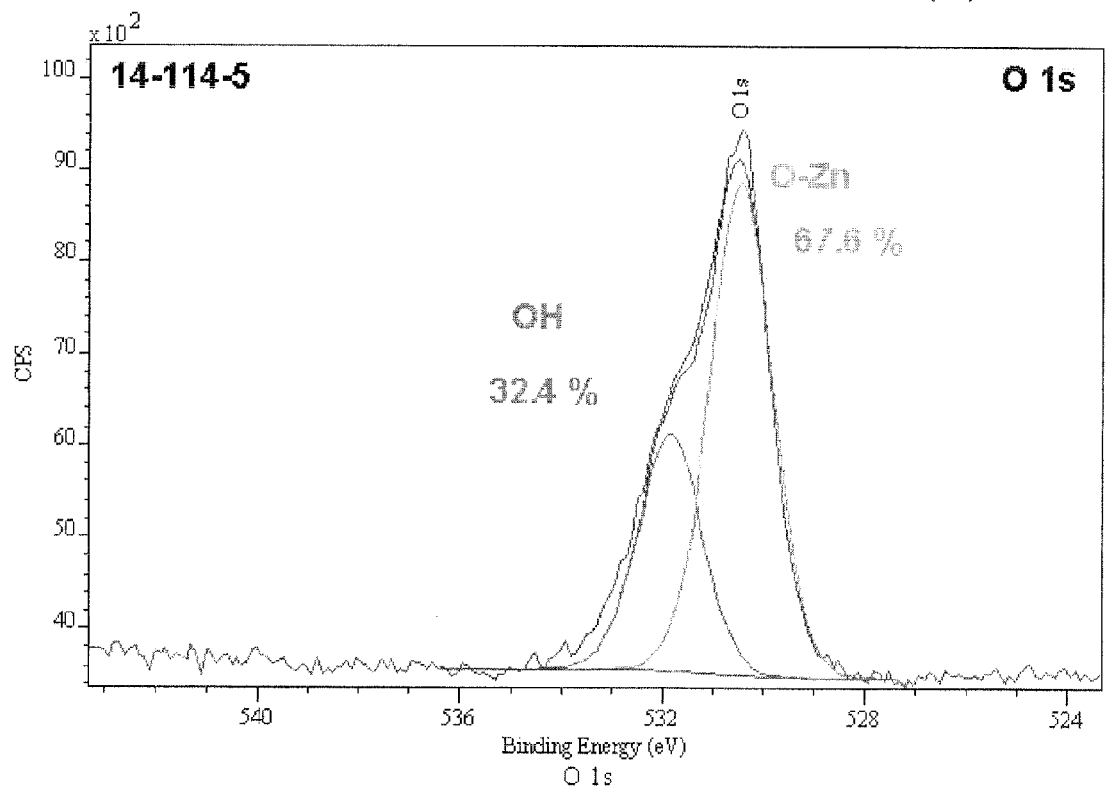
FIGS. 5(a) and 5(b) are XPS photoelectron spectroscopy graphs illustrating the chemical environment of the Zn atoms with (FIG. 5(a)) and without (FIG. 5(b)) oxygen ion beam treatment based on the O1s signals measured on the $ZnO_x$ layer.
Figure 5B:
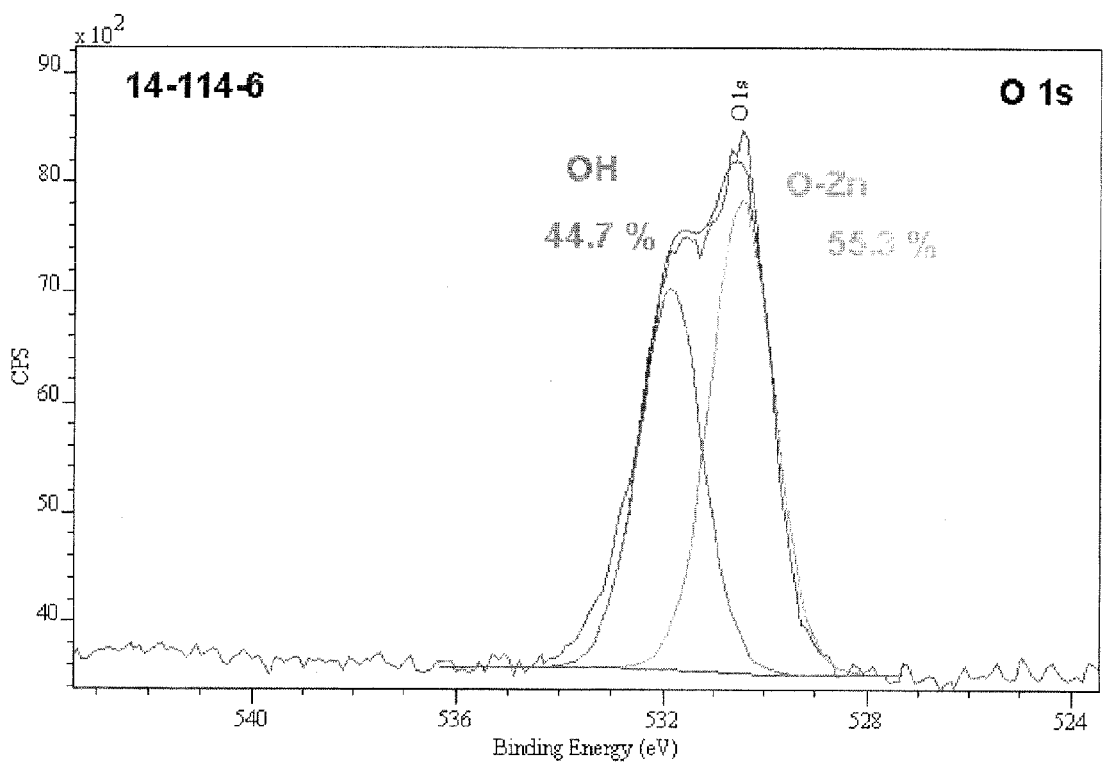

FIGS. 5(*a*) and 5(*b*) are XPS photoelectron spectroscopy graphs illustrating the chemical environment of the Zn atoms with (FIG. 5(*a*)—ion beam treated layer 17a') and without (FIG. 5(*b*)—nontreated layer 17a) oxygen ion beam treatment based on the O1s signals measured on the $ZnO_x$ layer. The impact of ion beam treatment, with oxygen ions in the ion beam 31 from the source 30, on the chemical composition of the ZnO surface can be seen especially on the O1s peak in the corresponding XPS spectra in FIGS. 5(*a*)-(*b*). It can be seen in FIGS. 5(*a*)-(*b*) that the ion beam treatment process using oxygen ions at 1500 V reduced the concentration of OH-groups on the outer surface of the ZnO layer from 45% to 32%. The outermost surface (the surface farthest from the glass substrate) of the ion beam treated zinc oxide layer will contain less OH-groups, because the information depth of XPS is about 5 nm. Therefore, the ion beam treatment of the zinc oxide based release layer renders the zinc oxide release layer less chemically reactive and provides for improved thermal stability and the reduction/elimination of overlap burning following HT. In certain example embodiments of this invention, the ion beam treatment 31 of the zinc oxide layer causes the concentration of OH-groups at the layer's outer surface to drop by at least 5%, more preferably by at least 10%. In certain example embodiments of this invention, after the ion beam treatment and/or after layer 17b has been deposited, the concentration of OH-groups at the surface of zinc oxide based layer 17a' farthest from the glass substrate is no greater than about 40%, more preferably no greater than about 35%, and most preferably no greater than about 33% (atomic % as with other percentages herein).

Accordingly, it can be seen that the ion beam treatment of the zinc oxide based release layer, e.g., in collimated mode using oxygen ions, passivates the surface of the zinc oxide based release layer. For example, macro particles on the surface of the layer will be passivated and no longer dominate the behavior of the product in terms of chemical durability. The ion beam treatment reduces the surface roughness of the zinc oxide based release layer, as well as the amount of OH groups, thereby improving thermal stability of the product especially in the overlap region where adjacent TPL films may have overlapped. Thus, surprisingly, it has been found that treating the zinc oxide inclusive release layer 17a with plasma including oxygen (e.g., via ion beam treatment), prior to deposition of the oxygen blocking or barrier layer 17b, improves thermal stability and/or quality of the product. Ion beam treatment of the layer comprising $ZnO_x$ 17a reduces the concentration of OH-groups on the layer's surface and reduces the layer's surface roughness, thereby improving the layer's thermal stability and reducing the likelihood of the undesirable burning.

After the ion beam treatment of the $ZnO_x$ at the far left of FIG. 2, a barrier layer (e.g., AlN layer) 17b is then deposited (e.g., sputter deposited) on the substrate 11 over the ion beam treated ZnO, 17a' in the center section of FIG. 2. Thus, the ion beam treated zinc oxide based release layer 17a' with reduced chemical reactivity is thereafter covered by a barrier layer 17b of or including a material such as AlN. An optional TPF film(s) 17c may then be formed on the substrate 1 over the layers 17a', 17b in certain example embodiments.

Thus, in the FIG. 2 example embodiment of this invention, the protective film 17 includes a first zinc oxide inclusive layer 17a, 17a' which is the release layer, and aluminum nitride inclusive layer 17b which is an oxygen barrier layer. An oxygen "blocking" or "barrier" layer means that the layer blocks significant amounts of oxygen from reaching the DLC during HT. The different compositions of layers 17a' and 17b cause different stresses in layers 17a' and 17b, which stresses are manipulated so as to allow the film 17 to be more easily removed during and/or following HT. Layer 17a, 17a' of or including zinc oxide (which may or may not be doped with from about 1-12% Al, more preferably from about 1-6% Al, and/or possibly doped with nitrogen) may be considered a release layer for allowing the film 17 to be easily removed from the DLC or substrate during and/or after HT, whereas the more dense layer 17b of or including a material such as aluminum nitride may be considered an oxygen blocking or barrier layer that reduces or prevents the DLC 11 from burning off and/or oxidizing during HT. Note also that any gettering layer may be considered an oxygen barrier layer in certain example instances. The more dense layer 17b also may be considered a blocking/protection layer for protecting the softer release layer 17a' during heat treatment, storage, and otherwise. Zinc oxide is a highly advantageous material for use in release layer 17a, 17a' because it can be easily removed (e.g., using water and/or vinegar) during and/or following HT in a non-toxic manner. In certain example embodiments, the release layer is a dielectric or semiconductor layer. One or both of layers 17a, 17b may be sputter-deposited on substrate 1 over the carbon based layer 11 in certain example embodiments of this invention. Note that one or both of layers 17a and 17b may be doped with other materials such as Zr, Ni, Fe, Cr, Ti, Mg, mixtures thereof, or the like, in certain example embodiments of this invention.

In certain example embodiments of this invention, release layer 17a may be deposited (e.g., via sputtering) so as to be from about 50-20,000 Å thick, more preferably from about 50-3,000 Å thick, even more preferably from about 100-2,000 Å thick, with an example thickness being from about 1,000-2,000 Å (e.g., about 1600 angstroms thick). In certain embodiments, aluminum nitride inclusive barrier layer 17b may be deposited (e.g., via sputtering) so as to be from about 200-10,000 Å thick, more preferably from about 300-5,000 Å thick, more preferably from about 400-800 Å thick, with an example thickness being about 600 Å. Release layer 17a, 17a' may be thicker than barrier layer 17b in certain example embodiments of this invention; e.g., layer 17a, 17a' may be at least 25% thicker than layer 17b in certain example instances prior to HT. A preferred thickness of overall sacrificial film 17 in certain example embodiments is less than about 10,000 Å, more preferably less than about 3,000 Å, and most preferably less than about 2,500 Å.

The coated article in the center section of FIG. 2 (except that the TPF 17c may have been removed) is then subjected to HT such as thermal tempering, and the protective film 17 made up of 17a' and 17b protects the DLC 11 from burning off during the HT as discussed herein. The protective film 17 may then be removed by application of a liquid such as vinegar and/or water, and brushing/wiping, to arrive at the coated article at the right part of FIG. 2.

Figure 3:
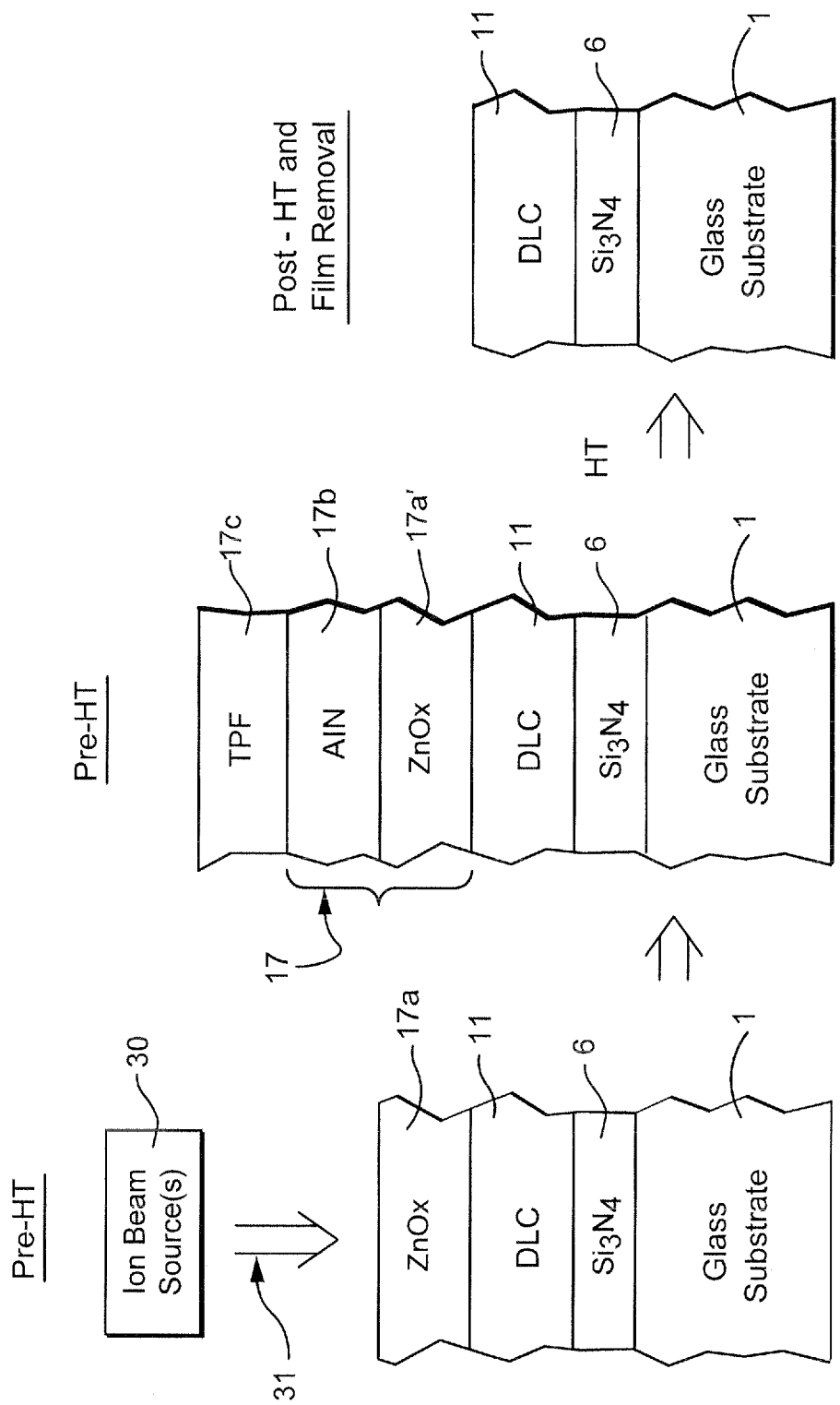
FIG. 3 is a schematic cross sectional view of a coated article, prior to and following heat treatment, according to another example embodiment of this invention.

FIG. 3 is applicable to any of the embodiments discussed herein. The FIG. 3 embodiment is the same as the FIG. 2 embodiment, except for additional dielectric layer 6 of or including a material such as silicon nitride and/or silicon oxide that is located between the carbon based layer 11 and the glass substrate 1. After heat treatment or HT (e.g., tempering), the product is exposed to a mildly reactive liquid (e.g., water, vinegar, dilute ammonia and/or bleach) as in other embodiments herein, and the liquid penetrates through to the release layer 17a' via pinholes or grain boundaries in the overlying layer(s) and causes the release layer to disband from the DLC 11. Thus, the release layer 17a', the oxygen barrier layer 17b, and the protective layer 17c can be removed. Vinegar is a particularly good release liquid for use with the materials shown, although other liquid(s) such as water may also or instead be used for removal of sacrificial film 17. As with other embodiments herein, brushing (e.g., via rotating brushes such as nylon brushes or the like) may be used to remove film 17 when wetted with water, vinegar, or the like in certain example instances. Example thickness for layer 6 are as follows in this example embodiment: barrier layer 6 of or including silicon nitride from about 100-300 Å thick (e.g., about 200 Å thick). It is also noted that the TPF 17c can be provided as layer 17c during storage and/or shipment, and can be peeled off before, during, or after HT. Such a protective TPF layer(s) 17c over the barrier layer 17b may be used in any embodiment herein.

In certain embodiments of this invention, other materials may be used. For example, oxygen blocking/barrier layer 17b need not be of aluminum nitride. A barrier layer 6 (discussed above in FIG. 3) may or may not be provided between the glass and the DLC. The oxygen blocking/barrier layer 17b may be of or include a material selected from the group consisting of: zinc oxide, silicon carbide, aluminum nitride, boron oxide, aluminum oxide, aluminum oxynitride, silicon nitride, silicon oxide, silicon oxynitride, and mixtures thereof. Preferred materials for the oxygen blocking or barrier layer 17b are aluminum nitride, aluminum oxynitride, and silicon carbide in certain example embodiments. In certain example embodiments, the layer 17b is designed to he at least as hard and/or durable as glass. Release layer 17a may be of material (e.g., zinc oxide, zinc oxynitride or zinc aluminum oxynitride, each of which may be doped with Al) that dissolves or readily reacts with water, vinegar, and/or bleach. Release layer 17a preferably has a melting point (or dissociation temperature) above 580 or 600 degrees C. in certain example embodiments. Note that the term "oxide" as used herein is broad enough to encompass suboxides. Release layer 17a, 17a) is typically more dissolvable than is layer 17b in water, vinegar, bleach and/or the like. Moreover, in certain example embodiments, oxygen barrier layer 17b is more of a barrier to oxygen and/or is harder than is release layer 17a, 17a'. Exemplary coatings may produce high quality post-HT and post-release DLC, with good hard water cleanability and good scratch resistance. The release layer 17a and/or the oxygen barrier layer 17b may be deposited via sputtering, or any other suitable technique, in different example embodiments of this invention.

An example process of manufacturing a coated article will now be described, with reference to FIGS. 2-3. Initially, glass substrate 1 is provided, and at least one barrier layer 6 (e.g., silicon oxide, silicon nitride, silicon oxynitride, or the like) may optionally be sputtered on a surface thereof. Optionally, a multi-layer solar control coating (not shown) may be deposited (e.g., via sputtering) on the surface of the glass substrate 1 opposite the barrier layer 6. At least one layer 11 of or including DLC is deposited (e.g., via ion beam deposition) on the glass substrate 1, over at least the optional barrier layer 6 if present. Then, protective film 17, e.g., including layers 17a and 17b, is deposited on the substrate 1 over the DLC inclusive layer 11. After zinc oxide based layer 17a has been deposited, but before layer 17b has been deposited, the zinc oxide based release layer is ion beam treated as discussed above. Protective film 17 may be deposited via sputtering, CVD, ion beam deposition, or any other suitable technique. Optionally, a thin protective layer (s) comprising TPF, DLC, silicon nitride, or silicon aluminum nitride (not shown), may be provided over sacrificial film 17 prior to HT, for durability and/or oxygen barrier purposes. As shown in FIGS. 2-3, the glass substrate 1 with films 6 (optional), 11 and 17 thereon is then heat treated (HT) for purposes of thermal tempering, heat bending, heat strengthening, and/or the like. At least part of this HT may be conducted, for example, in an atmosphere including oxygen as known in the art at temperature(s) of from 550 to 800 degrees C., more preferably from 580 to 800 degrees C. (i.e., temperature(s) above the burn-off temperature of DLC). The FIT may last for at least one minute, more preferably from 1-10 minutes, in certain example non-limiting embodiments of this invention. During HT, the presence of protective film 17 protects DLC inclusive layer 11 from the HT and prevents layer 11 from significantly oxidizing and/or burning off due to significant oxidation during the HT. While in some instances some of layer 11 may burn off during FIT, the majority if not all of DLC inclusive layer 11 remains on the substrate 1 even after the HT due to the presence of protective film 17. A significant advantage associated with using zinc oxide in the release layer 17a, 17a' is its ease of removal after HT. Sole layers of silicon nitride for example require complex etching in order to remove the same after HT. On the other hand, it has been found that when release layer 17a, 17a' is of or includes zinc oxide, the application of vinegar and/or water allows portions of film 17 remaining after HT to be easily removed (e.g., along with rubbing/brushing) in a non-toxic manner. In certain example instances, rubbing with such liquids may be especially beneficial in removing film 17 after HT when the coated article is still warm therefrom (e.g., when the film 17 is from about 80-200 degrees C., more preferably from about 100-180 degrees C.; although the removal of film 17 may also take place at room temperature in certain example embodiments). After film 17 has been removed, the remaining coated article is shown at the right side of FIGS. 2-3, and includes an outer layer comprising scratch resistant DLC 11. The aforesaid example processes are advantageous in that they provide a technique for allowing a coated article including a protective DLC inclusive layer 11 to be heat treated without the DLC layer 11 burning off or significantly oxidizing during such HT. In other words, it becomes possible to provide a protective DLC or other carbon based layer 11 on a heat treated (e.g., thermally tempered) product in a commercially acceptable manner. According to certain example embodiments of this invention, monolithic coated articles herein preferably have a visible transmission after HT of at least about 40%, more preferably of at least about 50 or 60%.

In certain example embodiments of this invention, there is provided a method of making a coated article, the method comprising: depositing a release layer comprising zinc oxide on a glass substrate, wherein at least a layer comprising carbon is located between the glass substrate and the release layer comprising zinc oxide; ion beam treating the layer comprising zinc oxide with at least oxygen ions to provide an ion beam treated layer comprising zinc oxide; depositing an oxygen barrier layer on the glass substrate over the ion beam treated layer comprising zinc oxide; and wherein a protective film comprising the ion beam treated layer comprising zinc oxide and the oxygen barrier layer are for protecting the layer comprising carbon during subsequent heat treatment in order to prevent significant burnoff of the layer comprising carbon.

In the method of the immediately preceding paragraph, said ion beam treating may comprise directing an ion beam including oxygen ions toward the release layer comprising zinc oxide, wherein the ion beam is substantially free of carbon ions.

In the method of any of the preceding two paragraphs, said ion beam treating may comprise directing an ion beam consisting essentially of oxygen ions toward the release layer comprising zinc oxide.

In the method of any of the preceding three paragraphs, the release layer may consists essentially of zinc oxide, which may optionally be doped with aluminum and/or nitrogen.

In the method of any of the preceding four paragraphs, said ion beam treating of the layer comprising zinc oxide may cause a concentration of OH-groups at an outer surface of the layer comprising zinc oxide to drop by at least 5%, more preferably by at least 10%.

In the method of any of the preceding five paragraphs, the oxygen barrier layer may comprise or consist essentially of aluminum nitride.

In the method of any of the preceding six paragraphs, the oxygen barrier layer may directly contact the ion beam treated layer comprising zinc oxide.

In the method of any of the preceding seven paragraphs, the layer comprising carbon may comprise diamond-like carbon (DLC).

The method of any of the preceding eight paragraphs may further comprise heat treating the glass substrate with at least following layers thereon: the layer comprising carbon, the ion beam treated layer comprising zinc oxide, and the oxygen barrier layer; and wherein said heat treating may comprise heating the glass substrate to temperature(s) sufficient for thermal tempering, heat strengthening, and/or heat bending of the glass substrate. The heat treating may comprise heating the glass substrate at temperature(s) of at least 550 degrees C., more preferably at least 580 degrees C.

The method of any of the preceding nine paragraphs may further comprise exposing the protective film to a release liquid and removing at least part of the protective film during and/or after heat treatment.

The method of any of the preceding ten paragraphs may further comprise adhering first and second overlapping polymer based layers (e.g., TPF layers) to an upper surface of the oxygen barrier layer.

The method of any of the preceding eleven paragraphs may further comprise sputter-depositing a layer comprising silicon nitride on the glass substrate, wherein the layer comprising silicon nitride may be located between the glass substrate and the layer comprising carbon.

In the method of any of the preceding twelve paragraphs, at least prior to heat treatment the ion beam treated layer comprising zinc oxide may be located between and directly contacting the layer comprising carbon and the oxygen barrier layer.

In the method of any of the preceding thirteen paragraphs, the layer comprising carbon may comprise amorphous DLC and have more $sp^3$ carbon-carbon bonds than $sp^2$ carbon-carbon bonds. The DLC may be hydrogenated.

In the method of any of the preceding fourteen paragraphs, the coated article may be substantially transparent at least following heat treatment and removal of the protective film.

In the method of any of the preceding fifteen paragraphs, after removing the oxygen barrier layer and the ion beam treated layer comprising zinc oxide, the layer comprising carbon may be exposed so as to be an outermost layer of the coated article.

In certain example embodiments, there is provided a method of making a heat treated coated article, the method comprising: heat treating a coated glass substrate, the coated glass substrate comprising, prior to the heat treating, a glass substrate, a layer comprising diamond-like carbon (DLC) on the glass substrate, and a protective film on the glass substrate over at least the layer comprising DLC, wherein the protective film includes (i) a release layer comprising zinc oxide which has been ion beam treated with at least oxygen ions, and (ii) and an oxygen barrier layer, the release layer and the oxygen barrier layer being of different material; during said heat treating of the coated glass substrate with the layer comprising DLC and the protective film thereon, the protective film prevents significant burnoff of the layer comprising DLC, and wherein the heat treating comprises heating the glass substrate to temperature(s) sufficient for thermal tempering, heat strengthening, and/or heat bending; and exposing the protective film to a release liquid and removing at least part of the protective film during and/or after said heat treating.

In the method of the immediately preceding paragraph, the oxygen barrier layer may comprise or consist essentially of aluminum nitride.

In the method of any of the preceding two paragraphs, the oxygen barrier layer may directly contact the ion beam treated layer comprising zinc oxide.

The method of any of the preceding three paragraphs may further comprise adhering first and second overlapping polymer based layers to an upper surface of the oxygen barrier layer.

In the method of any of the preceding four paragraphs, the layer comprising carbon may comprise amorphous DLC and have more $sp^3$ carbon-carbon bonds than $sp^2$ carbon-carbon bonds. The DLC may be hydrogenated.

In the method of any of the preceding five paragraphs, after removing the oxygen barrier layer and the ion beam treated layer comprising zinc oxide, the layer comprising DLC may be exposed so as to be an outermost layer of the coated article.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a coated article, the method comprising:
    depositing a release layer comprising zinc oxide on a glass substrate, wherein at least a layer comprising carbon is located between the glass substrate and the release layer comprising zinc oxide;
    plasma treating the layer comprising zinc oxide including ZnO—Zn cermet with at least oxygen ions to provide an ion beam treated layer comprising zinc oxide and to transform at least part of the ZnO—Zn cermet to a more stable ZnOx;
    depositing an oxygen barrier layer on the glass substrate over the plasma treated layer comprising zinc oxide; and
    wherein a protective film comprising the plasma treated layer comprising zinc oxide and the oxygen barrier layer are for protecting the layer comprising carbon during subsequent heat treatment in order to prevent significant burnoff of the layer comprising carbon.

2. The method of claim 1, wherein said ion beam treating comprises directing an ion beam including oxygen ions toward the release layer, wherein the ion beam is substantially free of carbon ions.

3. The method of claim 1, wherein said ion beam treating comprises directing an ion beam consisting essentially of oxygen ions toward the release layer.

4. The method of claim 1, wherein the release layer consists essentially of zinc oxide, which may optionally be doped with aluminum and/or nitrogen.

5. The method of claim 1, wherein said ion beam treating of the release layer causes a concentration of OH-groups at an outer surface of the release layer to drop by at least 5%.

6. The method of claim 1, wherein said ion beam treating of the release layer causes a concentration of OH-groups at an outer surface of the release layer to drop by at least 10%.

7. The method of claim 1, wherein the oxygen barrier layer comprises aluminum nitride.

8. The method of claim 1, wherein the oxygen barrier layer consists essentially of aluminum nitride.

9. The method of claim 1, wherein the oxygen barrier layer directly contacts the release layer that has been ion beam treated.

10. The method of claim 1, wherein the layer comprising carbon comprises diamond-like carbon (DLC).

11. The method of claim 1, further comprising heat treating the glass substrate with at least following layers thereon: the layer comprising carbon, the ion beam treated release layer, and the oxygen barrier layer; and
    wherein said heat treating comprises heating the glass substrate to temperature(s) sufficient for thermal tempering, heat strengthening, and/or heat bending of the glass substrate.

12. The method of claim 11, wherein the heat treating comprises heating the glass substrate at temperature(s) of at least 550 degrees C.

13. The method of claim 11, further comprising exposing the protective film to a release liquid and removing at least part of the protective film during and/or after the heat treating.

14. The method of claim 1, further comprising adhering first and second overlapping polymer based layers to an upper surface of the oxygen barrier layer.

15. The method of claim 1, further comprising sputter-depositing a layer comprising silicon nitride on the glass substrate, wherein the layer comprising silicon nitride is located between the glass substrate and the layer comprising carbon.

16. The method of claim 1, wherein at least prior to heat treatment the release layer that has been ion beam treated is located between and directly contacting the layer comprising carbon and the oxygen barrier layer.

17. The method of claim 1, wherein the layer comprising carbon comprises amorphous DLC and has more $sp^a$ carbon-carbon bonds than $sp^2$ carbon-carbon bonds.

18. The method of claim 1, wherein the layer comprising carbon comprises hydrogenated DLC.

19. The method of claim 1, wherein the coated article is substantially transparent at least following heat treating and removal of the protective film.

20. The method of claim 1, wherein after removing the oxygen barrier layer and the release layer, the layer comprising carbon is exposed so as to be an outermost layer of the coated article.

21. The method of claim 1, wherein the oxygen barrier layer is an outermost layer of the coating after the coated article has been made and is exposed to ambient atmosphere.

\* \* \* \* \*